UNITED STATES PATENT OFFICE.

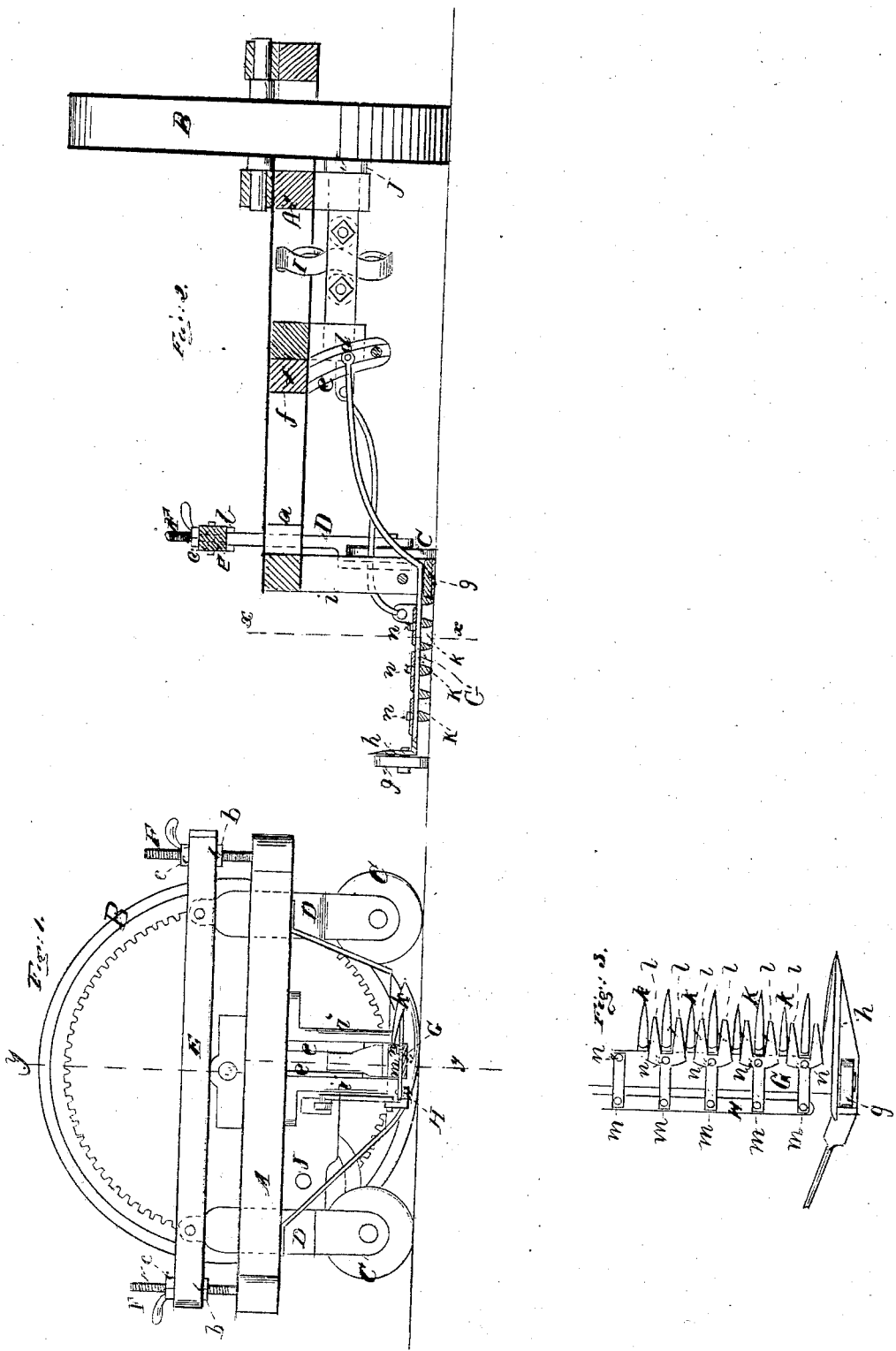

CHARLES T. STETSON, OF AMHERST, MASSACHUSETTS.

IMPROVEMENT IN HARVESTERS.

Specification forming part of Letters Patent No. 17,705, dated June 30, 1857.

*To all whom it may concern:*

Be it known that I, CHARLES T. STETSON, of Amherst, in the county of Hampshire and State of Massachusetts, have invented certain new and useful Improvements in Harvesters; and I do hereby declare that the following is a full, clear, and exact description of the same, reference being had to the annexed drawings, making part of this specification, in which—

Figure 1 is a side view of the main frame of the machine, the finger-bar and sickle being bisected transversely, as indicated by the line $x\,x$ in Fig 2. Fig. 2 is a longitudinal vertical section of the same. $y\,y$, Fig. 1, show the plane of section. Fig. 3 is a plan or top view of the sickle and finger-bar.

Similar letters of reference indicate the same parts in the three figures.

My invention consists in the peculiar manner in which the finger-bar is connected to the main frame, whereby the finger-bar and sickle are allowed to rise and fall to a certain extent independently of the frame, and thereby enabled to conform to the inequalities of the ground.

To enable others skilled in the art to fully understand and construct my invention, I will proceed to describe it.

A represents the main frame of the machine, which is of rectangular form, and supported at one end by a main or driving wheel, B. The opposite end of the frame A is supported by two wheels, C C, which are placed or fitted to the lower ends of vertical bars D, which pass through guides $a$, attached to the frame A. The upper ends of the bars D are pivoted in mortises made in a bar, the mortises being sufficiently long to allow the bar E a certain degree of play, so that it may be adjusted to a requisite extent out of a horizontal line. The bars D are connected to the bar E near its ends, and through each end of the bar E a screw-rod, F, passes. The ends of the bar E rest on nuts $b$ on the rods F, and thumb-nuts $c$ are placed on the rods F above the bar E.

G represents the finger-bar, which is a flat metal bar of the usual or requisite dimensions. The finger-bar is curved upward at its inner end or part, and the curved portion is gradually narrowed from its commencement to its end. The inner end of the finger-bar G has an eye formed on it, through which a small shaft passes, said shaft having a friction-roller, $d$, on each end. The friction-rollers $d$ are fitted and allowed to work freely up and down within grooved segment-guides $e\,e$, which are secured to the under side of a cross-tie, $f$, in the frame A. The outer end of the finger-bar G has a roller or wheel, $g$, attached to it; or the roller may be attached to the shoe $h$. This roller supports the outer end of the finger-bar. The finger-bar is fitted in a guide formed of two pendants, $i\,i$, attached to the end of the frame A, and a horizontal bar, $j$, which is attached to the lower ends of said pendants, the bar $j$ having a groove or recess made in it to receive the finger-bar.

To the finger-bar G the usual fingers, $k$, are attached in the ordinary way, and to the upper surface of the finger-bar G the cutters $l$ are attached. The cutters are of taper or V form, and are placed at the ends of bars $m$, two to each bar, the bars being pivoted to the finger-bar G, as shown at $n$. A requisite space is allowed between the teeth of each bar, and the fingers are attached to the finger-bar at such distances apart that the edges of the cutters on each bar $m$ will work or pass alternately over the edges of the fingers at each side of them. By this arrangement of the cutters a very short stroke or vibration only is required.

The ends of the bars $m$ are pivoted to a bar, H, which has a reciprocating motion given it by a sinuous or zagzag-shaped cam, I, placed on a shaft, J, which is driven by gearing from the main or driving wheel B. In consequence of having the cutters arranged as shown—viz., two attached to each bar $m$—the short stroke or vibration is not only obtained, but the fingers are placed quite close together, a small space only being allowed between them, and the cutters are therefore protected from small stones, which in other harvesters frequently pass between the fingers and injure the sickle. There is also another advantage. In consequence of the short stroke of the cutters a good leverage or power is obtained, for the distance between the bar H and fulcrum-pins $n$ is greater than the distance between the pins $n$ and the points of the cutters.

By having the finger-bar G arranged as shown it is allowed to yield or "give" at either end, or it may rise and fall bodily. The sickle therefore is allowed to conform perfectly to the inequalities of the surface of the ground.

The end of the frame A, when the wheels C C are attached or applied, may be raised or lowered, so that the sickle may cut the desired height from the surface of the ground, by adjusting the nuts $b$ $c$ on the rods F, and as the upper ends of the bars D are pivoted in the bar E, and the mortises in said bar made sufficiently long to allow the bar E a certain degree of longitudinal movement, the frame may be inclined or adjusted out of a horizontal line, so as to give a corresponding position to the sickle and allow the points of the cutters to incline toward the ground or upward from it. By this means the sickle, when the points of the cutters incline downward, will cut close on level ground, and on stony or uneven ground the points of the cutters, which should then be inclined upward, will have a tendency to pass readily over obstructions.

I am aware that the finger and cutter bars of reaping and mowing machines have been variously attached so as to conform to the irregularities of the ground, and I therefore do not claim attaining this end irrespective of the peculiar means employed for that purpose; but,

Having thus described my invention, what I claim as new, and desire to secure by Letters Patent, is—

Attaching the finger-bar G to the frame A by means of the guides $i$ $i$ and the grooved segment guides $e$, the inner end of the bar being provided with friction-rollers $d$, which are fitted and work in said segment-guides $e$, the parts being arranged substantially as described, for the purpose set forth.

CHARLES T. STETSON.

Witnesses:
JAMES W. BOYDEN,
J. T. DOW.